United States Patent Office 3,310,946
Patented Mar. 28, 1967

3,310,946
METHOD FOR MINIMIZING COMBUSTION INSTABILITY
Richard A. Dobbins, Providence, R.I., assignor, by mesne assignments, to the United States of America as represented by the Secretary of the Navy
No Drawing. Filed Oct. 5, 1965, Ser. No. 493,276
2 Claims. (Cl. 60—219)

The present invention relates generally to means for suppressing combustion instability and, more particularly, to fuel additives for damping acoustic-type disturbances which detrimentally affect the stability of combustion processes taking place in confined spaces.

The stability of the combustion process has long been a problem in the development and operation of both liquid and solid propellant rocket motors. One cause of this instability is the acoustic disturbances generated within the combustion chamber during the burning process. The damping of these acoustic waves in solid fuel rocket motors by the addition of fuel components that produce a particulate product of combustion has been accomplished through the use of empirical knowledge in the prior art. For example, metallic aluminum added to the propellant composition for the purpose of augmenting the specific impulse has been found to produce particulate products of combustion which attenuate these disturbances through mechanisms that are now understood. However, metallic aluminum, when added for the above purpose, does not always provide the most effective solution for the stability problem. On occasions a serious acoustic disturbance does develop even when metallic aluminum is a constituent of the fuel. The reason for this is that the metallic species enters into the combustion process and the particle size of the resulting particulate product of combustion is modified by poorly understood condensation and collision processes. The particle size of chemical species formed by the combustion process, therefore, cannot be preselected or otherwise controlled.

It is now known that sound waves of a given frequency are attenuated most effectively by particles of a particular size. Furthermore, the nature of the sound waves accompanying the combustion process in rockets and the manner in which the optimum size particle damping these waves depends upon the geometry of the rocket motor, the propellant properties and motor operating conditions, has also recently been determined. Namely, the optimum particle size $D_0$ (cm.) for attenuating sound waves of frequency $f$ (cycles per second) is given by the expression (1) $$D_0 = \left(\frac{9\,\mu}{\pi f \rho'}\right)^{1/2}$$

where $\mu$ (poise) is the dynamic viscosity of the gas in which the particles are suspended, and $\rho'$ (gms. per cm.$^3$) the density of the material of which the particle is composed. It can thus be seen that the particle size that most efficiently attenuates sound of a given frequency is independent of the pressure of the gas and depends only on the temperature insofar as this temperature influences the dynamic viscosity of the gas. Since the dynamic viscosity is proportional to the square root of temperature, the optimum particle size is only weakly dependent on the rocket chamber temperature. The approximate particle diameter for maximum acoustic attenuation at typical conditions in a rocket combustion chamber (with an assumed dynamic viscosity of $9.0 \times 10^{-4}$ poise and a particle density of 4.0 gm./cm.$^3$) for such frequencies as 500, 5000 and 50,000 cycles per second, thus turns out to be 11, 3.6 and 1.1 microns, respectively, regardless of combustion chamber pressure.

The frequency of the acoustic disturbances generated in rocket motors is determined by the geometry of the rocket motor and the speed of sound in the burning gases. That is, the dimensions of the rocket motor determine the wavelength of the acoustic disturbance which is most often excited. For example, the fundamental transverse mode will be excited at a frequency whose wavelength is twice the length of the motor. Similarly, the frequency of the radial and tangential acoustic modes of excitation and their harmonics are directly determined by the rocket motor size.

The present invention makes use of the fact that the rocket motor size determines the wavelength of the acoustic disturbance and that this disturbance can be best attenuated or suppressed by the presence in the combustion chamber of finely divided materials of the most suitable, or optimum, particle size.

It is, therefore, a primary object of the present invention to provide a fuel additive for solid and liquid rocket propellants which will most efficiently attenuate the acoustic disturbances that frequently cause combustion instability.

It is another object of the present invention to provide a method to suppress the acoustic disturbances in a rocket motor which involves the incorporation of particulate materials directly into the propellant during the manufacturing process.

At yet still further object of the present invention is to provide a method to stabilize the combustion process of rockets by the addition of inert particulate material to the propellant in a manner which does not seriously reduce the specific impulse of the propellant or propellants.

A yet still further object of the present invention is to provide an arrangement for the suppression of acoustic disturbances in combustion processes which allows the particle size that damps these disturbances most effectively to be preselected and controlled.

According to the present invention, the objects enumerated above are achieved by the addition of chemically inert particles to the propellant in a manner that does not appreciably change their sizes during the combustion process. More specifically, refractory particulate material is added to the propellant or otherwise introduced into the combustion chamber during the burning process. This material is fully oxidized and chemically inert and, consequently, its particle size is stable in the combustion chamber. This material need not remain solid. Molten particles, if produced, will attenuate the acoustic disturbances with an efficiency equal to that of solid particles of equal diameters. Some of the materials of the present invention that can be added include, but are not limited to, the oxides of aluminum, beryllium, calcium, magnesium, silicon, titanium, zirconium, and such other compounds as silicon carbide and boron nitride. Of course, the material that is used should not vaporize at the flame temperature and pressure sustained in the rocket combustion chamber. The following table is a partial list of typical materials, such as those mentioned above, which may be considered for use together with their densities, melting points and normal boiling points:

PROPERTIES OF SELECTED REFRACTORY MATERIALS

| Oxide | Density (gm./cm.$^3$) | Melting Point (° K.) | Estimated Normal Boiling Point (° K.) |
|---|---|---|---|
| $Al_2O_3$ | 4.0 | 2,320 | 3,800 |
| $BeO$ | 3.0 | 2,820 | 4,530 |
| $BN$ | 2.2 | [1] 3,300 | |
| $CaO$ | 3.4 | 2,860 | 3,800 |
| $MgO$ | 3.6 | 3,075 | 3,350 |
| $SiC$ | 2.8 | 2,900 | |
| $SiO_2$ | 2.3 | 2,000 | 2,500 |
| $TiO_2$ | 4.2 | 2,100 | |
| $Ti_2O_3$ | 4.6 | 2,400 | 3,300 |
| $ZrO_2$ | 5.5 | 2,960 | 4,570 |

[1] Sublimes.

The actual material used in any one case will usually depend upon the availability of the particular form of the material in the proper sizes and economic factors. As mentioned hereinbefore, the optimum size can be determined beforehand from a knowledge of the acoustic frequency most usually excited in the rocket motor and the use of Equation 1 with the appropriate values inserted for the particle density and dynamic viscosity of the gas.

Although there is an optimum particle size for suppressing a particular acoustic disturbance in a given rocket motor, particulate material is almost never available in a monodispersed form, i.e., of uniform diameters, which would allow all particles added to the propellant to have this optimum dimension. In other words, particulate materials are only available as a polydispersion. Studies of the influence of size distribution indicate that ideally the volume-to-surface diameter $D_{32}$ should be typically 90% of the optimum size, diameter $D_o$ calculated from Equation 1. The volume-to-surface mean diameter is defined as $$(2) \quad D_{32} = \frac{\int N_r(D) D^3 dD}{\int N_r(D) D^2 dD}$$

where $N_r(D)$ is the particle size distribution function. The availability of only polydispersed particulate material is not a serious limitation on the utility of the present invention. Of course, it follows that the most efficient polydispersion will be that which possesses the narrowest distribution of particle sizes about the optimum one.

The addition of inert particulate material to the propellant specie will usually act to lower the flame temperature of the fuel-oxidizer combination and thereby reduce the specific impulse. However, this deterioration of specific impulse is minimized in the present invention because with optimum size particles present in the combustion chamber, the amount of material needed is minimized. The amount of attenuation for optimum size particles is given by the expression $$(3) \quad \alpha_o \lambda = \pi C_m$$

where $\alpha_o$ = attenuation coefficient defined such that $\exp(-\alpha x)$ is the fractional loss of energy in the acoustic field in traversing a distance $x$ $C_m$ = mass of particles per unit mass of gaseous products of combustion and $\lambda$ = the wavelength of the acoustic disturbance Thus, with a mass fraction of 3% of optimum size particles, the attenuation of energy per wavelength will be 10%. The minimum amount of a particulate additive that is necessary to suppress the instability encountered in any given situation can best be determined by actual test.

In the case of solid propellant rocket motors, the particulate materials may be applied directly into the propellant during the manufacturing process. Such materials should be uniformly distributed throughout the propellant in order to assure a continuous and steady supply of particles in the combustion chamber throughout the burning time of the propellant. The addition of the small concentrations of these particulate materials to the solid propellant fuel does not introduce any problems with regard to the chemical compatibility of these materials, the oxidizer and other components of the fuel because of their chemically inert nature. As noted hereinbefore, some propellant formulations include metallic aluminum for the purpose of augmenting specific impulse. While this metallic aluminum will be burned; forming aluminum oxide particles, these particles will not necessarily be of a size that will efficiently attenuate the lower frequencies.

With liquid propellant rockets, the particulate material may be incorporated into the fuel as a slurry and this slurry may be rendered capable of being pumped by use of suitable carrier agents which preferably can be burned as fuel. In some cases, of course, the particulate additive may be mixed directly with the fuel or oxidizer without the use of an additional carrier agent.

It should also be understood that the present invention may be utilized with hybrid or monopropellant rocket engines and is not necessarily restricted to rockets using liquid or solid propellants exclusively.

Obviously many modifications and variations of the present invention are possible in the light of the above teachings. It is therefore to be understood that within the scope of the appended claims the invention may be practiced otherwise than as specifically described.

What is claimed is:

1. In a method for decreasing the combustion instability occurring during the burning of a propellant fuel within the combustion chamber of a rocket motor, which stability is due to the excitation of acoustic wave energy of a predominant frequency $f$ within the combustion chamber, the step of introducing into the combustion chamber refractory particulate material that is chemically inert, fully oxidized and that remains dimensionably stable during the burning process, said material having an average diameter in centimeters equal to $$\left(\frac{9}{\pi} \frac{\mu}{f\rho'}\right)^{\frac{1}{2}}$$

where $\mu$ (poise) is the dynamic viscosity of the gas in which the particles are suspended, $\rho'$ (gms. per cm.$^3$) the density of the material of which the particles are composed, and $f$ the frequency in cycles per second of the predominant acoustic wave energy which is excited within the combustion chamber.

2. In a method for decreasing the combustion instability occurring during the burning of a propellant fuel within the combustion chamber of a rocket motor, which stability is due to the excitation of acoustic wave energy of predominant frequency within the combustion chamber the step of adding to the propellant fuel refractory particulate material that is chemically inert, fully oxidized and that remains dimensionably stable during the burning process, said material having an average diameter in centimeters equal to $$\left(\frac{9}{\pi} \frac{\mu}{f\rho'}\right)^{\frac{1}{2}}$$

where $\mu$ (poise) is the dynamic viscosity of the gas in which the particles are suspended, $\rho'$ (gms. per cm.$^3$) the density of the material of which the particles are composed, and $f$ the frequency in cycles per second of the predominant acoustic wave energy which is excited within the combustion chamber.

References Cited by the Examiner

UNITED STATES PATENTS

| | | | |
|---|---|---|---|
| 3,098,351 | 7/1963 | Higgins et al. | 60—35.4 |
| 3,112,609 | 12/1963 | Bridgforth | 60—35.4 |

CARL D. QUARFORTH, *Primary Examiner.*

L. DEWAYNE RUTLEDGE, *Examiner.*

S. J. LECHERT, Jr., *Assistant Examiner.*